Figure 3:
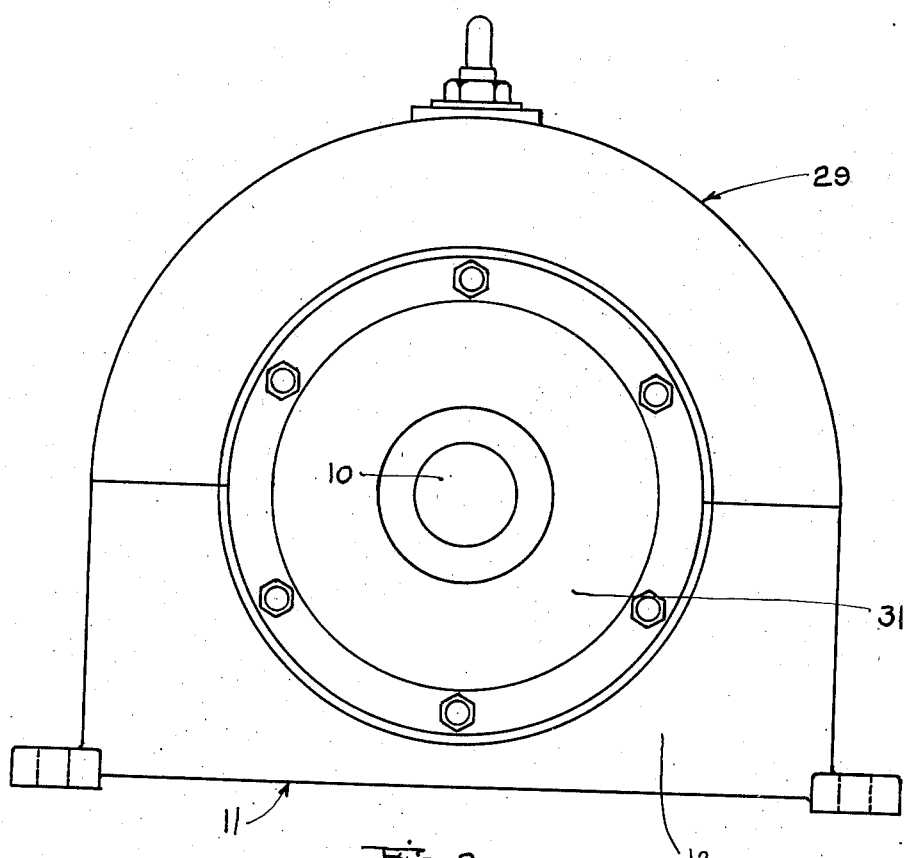

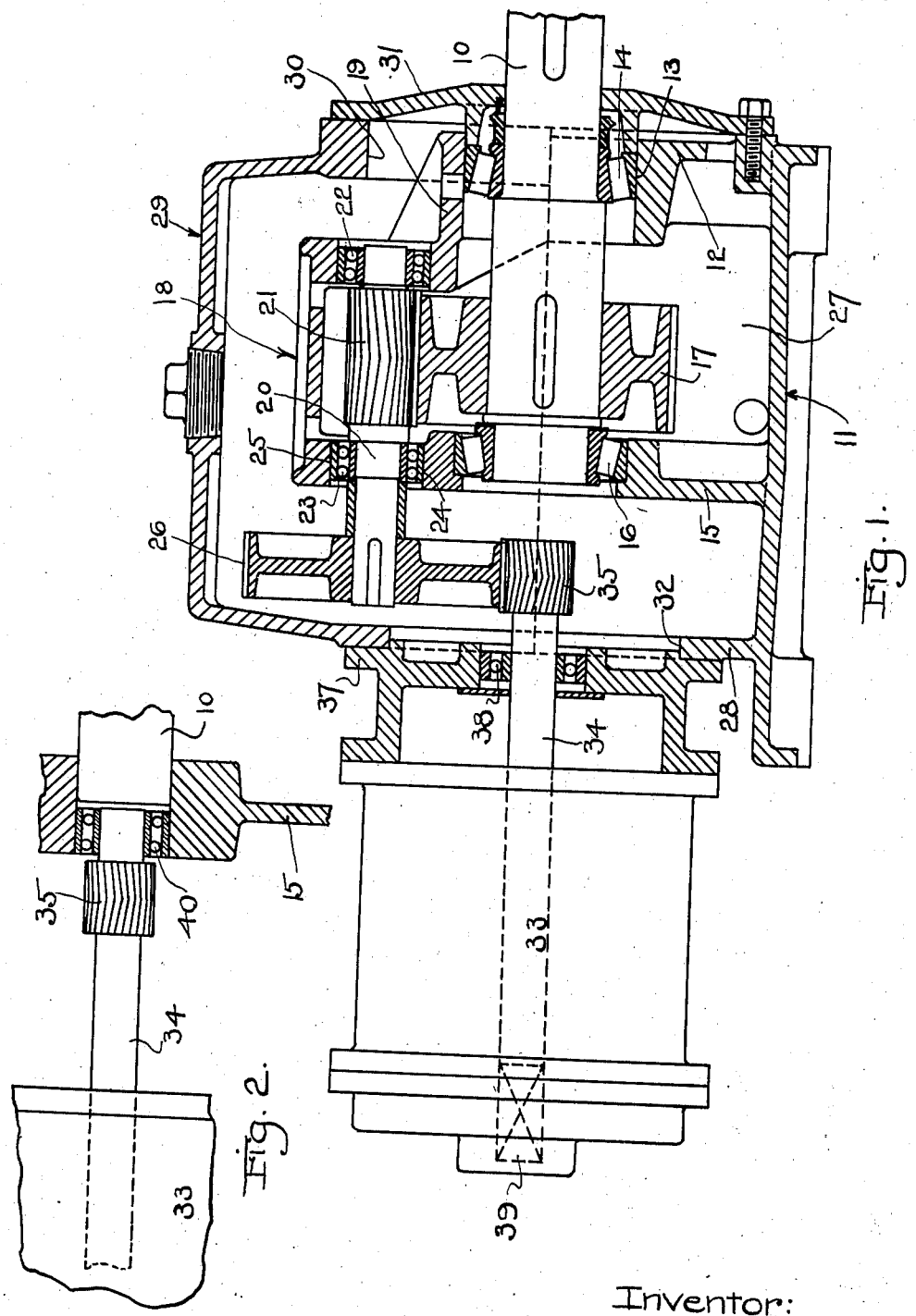

Oct. 7, 1941.                W. G. JONES, JR                    2,257,747
                     GEAR SPEED REDUCER AND THE LIKE
              Filed Sept. 5, 1940            2 Sheets-Sheet 2

Inventor:
Warren G. Jones, Jr.,
by Thos. A. Lanny Jr.

Patented Oct. 7, 1941

2,257,747

UNITED STATES PATENT OFFICE 2,257,747

GEAR SPEED REDUCER AND THE LIKE

Warren G. Jones, Jr., River Forest, Ill.

Application September 5, 1940, Serial No. 355,451

9 Claims. (Cl. 74—421)

This invention has to do with improvements in gear speed changing devices, and the like; and more particularly the present invention concerns itself with improvements in motorized gear reducers—that is, reducers wherein the driving motor constitutes or comprises a definite or integral portion of the unit.

More particularly, the present invention relates to improvements in motorized gear reducers wherein the gear reduction mechanism is of that general type disclosed in my co-pending application of Letters Patent of the United States, Serial No. 314,202. In that application, and in that type of gear reducer, there are provided aligned high and low speed shafts, the high speed shaft being provided with a driving pinion and the low speed shaft being provided with a driven gear; and there is also provided at least one back shaft or intermediate shaft carrying a gear meshing with the pinion of the high speed shaft and also carrying a pinion meshing with the gear of the low speed shaft; and in the disclosures of that application such back or intermediate shaft is carried by and journalled in a removable frame section. This removable frame section is removably and rigidly connected to the permanent frame of the structure, irrespective of the cover or housing enclosure, so that said back or intermediate shaft unit may be very strongly supported, and so that the complete gear train assembly may be effected and adjusted and drivingly operated even when the cover or housing enclosure is removed. Furthermore, this arrangement makes it possible to set the back or intermediate shaft unit into place with respect to the high and low speed shafts, and with respect to the pinion and gear thereof, by a direct or lateral movement of said unit (as distinguished from an endwise or axial movement thereof), thereby making it possible to bring the respective gears and pinions into mesh, even when these are of the double helical or herringbone type. This arrangement also makes it possible to readily adjust the bearings for the high and low speed shafts prior to setting the back or intermediate shaft unit into place, and without the interference of such unit during such operations. Other advantages and benefits of this arrangement are also apparent, some of which are set forth in my aforesaid co-pending application.

Now, in the arrangements shown and described in that copending application the high speed shaft, and its pinion, are journalled and carried as a definite or integral portion of the gear reducer unit proper, and the driving motor is connected to the high speed shaft by means of a suitable coupling; but the motor element therein shown is a distinct unit from the gear reducer assembly, and the necessary bearings for the high speed shaft of the reducer element are completely distinct from such motor element. This arrangement requires the provision of a suitable base extension, or other suitable mounting for the motor element, requires the provision of the coupling between the motor shaft and the reducer high speed shaft, requires additional bearings for the several shafts, and in other manners presents disadvantages of construction and first cost, as well as costs of operation and unkeep.

The main object of the present invention is to provide a combined motor and gear reducer unit, or a "motorized reducer," embodying the features of the back or intermediate shaft assembly unit, together with the driven gear and the driving pinion thereof, of the general type and features disclosed in my aforesaid co-pending application, Serial No. 314,202, but of modified construction to embody and incorporate the driving motor as a distinct portion of the combined complete unit; and modified or improved in the sense that the high speed shaft of the reducer unit comprises the motor shaft or a portion thereof, and in the sense that the high speed pinion is carried directly by the motor shaft or a portion thereof, and in the sense that the bearings for the high speed shaft element of the reducer unit are the same as the bearings for the motor shaft. The present application also concerns itself with improvements in the sense that the reducer unit or element may be completely assembled and adjusted, with the exception of the back or intermediate shaft unit, whereupon the motor element, including the high speed pinion may be assembled to the reducer unit aforesaid; and thereafter the back or intermediate shaft unit may be set into place, and be brought into proper mesh with the pinion and the gear of the high and low speed shafts, respectively, by lateral movement of such back or intermediate shaft unit, even when use is made of double helical or herringbone teeth on the parts. It is a further important object of the invention in this connection to enable the accomplishment of the foregoing operations without the need of any tilting or rocking movement of the high speed shaft and its pinion during such assembly.

In connection with the foregoing it is a further object of the invention to make suitable provision for support of the motor element of such combined arrangement, directly by the frame of the reducer itself, and without the need of placement of the removable cover on the reducer housing, so that the motor element, together with the "high" speed shaft and its pinion will be properly supported with respect to the reducer elements during the setting and securing of the back or intermediate shaft unit into place with respect to the other portions of the complete assembly. With the parts in such relationship, and with the cover of the housing removed, the assembled parts may be brought into final adjustment, and, in fact they may be operated for gear reduction purposes with the housing cover still removed.

Sometimes the features of the present invention will be incorporated in "double" reduction gear reducers, that is, those in which there is but a double reduction of speed from the high or motor shaft to the low or finally driven shaft; and such an arrangement I have shown in the drawings hereof; but in other cases said features will or may be incorporated in "triple" or even "plural" reduction gear reducers, wherein more than a double reduction of such speed is accomplished; and I contemplate all such additional forms or types as also being within the scope of my present invention, and covered hereby, except as I may otherwise limit myself in the claims to follow.

Furthermore, the features herein disclosed may be used in either horizontal or vertical types of construction, that is, those wherein the shafts are either horizontal or vertical; and therefore, notwithstanding that I have herein shown and shall describe only a single construction and type (namely, the horizontal type) still I do not intend to limit myself thereto, except as I may do so in the claims to follow.

The invention also includes other features and objects, as will be apparent from a study of a detailed description of the invention, which consists in the features and structures hereinafter described and claimed.

In the drawings:

Figure 1 shows a longitudinal vertical section through a typical "double" reduction type of construction, embodying the features of my present invention, and wherein both of the motor shaft or high speed shaft bearings are embodied in the motor element proper, the high speed pinion also being carried by said shaft and as a part of such element;

Figure 2 shows a fragmentary longitudinal section through the pinion end portion of a modified form of motor or high speed shaft element, wherein the bearing therefor is carried by the bracket of the frame of the reducer element, the bearing for the other end of the motor or high speed shaft being at the outer or far end of the motor element itself; and Figure 3 shows an end elevation of the unit, looking towards the gear casing end remote from the motor, being applicable to either of the arrangements shown in Figures 1 and 2.

In the drawings, the low speed shaft is designated by the numeral 10. The frame of the reducer element is designated generally by the numeral 11. It has at the low speed end a bracket 12 having the semi-bearing support 13 for the bearing 14 of the low speed shaft; and in the body of the frame element there is a further bracket 15 which carries the bearing 16 for the other end of the low speed shaft. This bracket 15 is shown as having a complete bearing support for the bearing 16. The gear 17 is carried by the low speed shaft between the bearings 14 and 16 thereof.

There is also shown a removable frame section unit 18 (generally above the shaft 10 and gear 17, but not necessarily so). This removable frame section 18 has the endwise projecting extension 19 which overlies and completes the support for the bearing 14; and the other end of this removable frame section overlies and is connected to the top of the bracket 15 as shown. This removable frame section also carries a back or intermediate shaft 20 having thereon the pinion 21 which meshes with the gear 17; and at its back end the said back or intermediate shaft is journalled by the journal or bearing 22, completely carried by the removable frame section. The bearing 23 for the front or other end of the shaft 20 is shown as being carried by the semi-support 24 on the upper end of the bracket 15, and by a companion semi-support 25 of the removable frame section. The shaft 20 extends beyond the bearing 23 and carries the gear 26 on its projecting portion.

The frame 11 is also provided with suitable side walls, 27, and with a front end wall 28; and these, together with the end bracket 12, reach upwardly to the horizontal plane at the position of the axis of the shaft 10, so that this frame 11 in effect extends upwardly to that elevation, and provides an oil basin or semi-housing to that elevation. Nevertheless, it will be seen that when the removable frame section 18 is secured in place the bearing 14 is completely supported, and also that the back or intermediate shaft 20 together with its gear 26 and pinion 21 are completely supported, and that the said pinion 21 may be brought into mesh with the low speed gear 17 by a lateral movement during the assembly operations. The structure so far described is therefore completely self-contained, and the low speed shaft and the back or intermediate shaft are both properly supported and journalled.

I have provided a removable top or cover section 29. This cover section may be set down over the structures so far described and secured in place to complete the housing assembly, but is not actually needed in order to complete the bearings supports. This cover may therefore be set into place after the low and back or intermediate shafts have been brought into adjustment, and the parts may be adjusted and tested with the cover off, so as to facilitate such adjustments and for other reasons.

Preferably the rear end portion of the cover 29, and the bracket 12 of the frame element 11, are so formed that when the cover is in place there is left an opening 30 at the low speed end of the assembly; and a suitable cover plate 31 may be provided for this opening. Likewise, the front end wall 28 of the frame section 11, and the front portion of the cover 29 may be so formed that when the cover is in place there is left a relatively large opening 32 at the front or high speed end of the device, through which opening the lower portion of the gear 26 is accessible from the front of the reducer assembly.

Now the structures so far described are in general the same as certain of the structures shown and described in my co-pending application, Serial No. 314,202, already referred to. In this connection, also, the bearings 14 and 16 may be of locking construction so that the low speed shaft is held against any endwise movement; and the bearings 22 and 23 of the back or intermediate shaft 20 may be of type to allow for endwise floating adjustment, so that when the gear 17 and the pinion 21 are of the double helical or herringbone type the shaft 20 will float to an exact mesh at all times, and thereby ensure perfect loading of the teeth at all points. Furthermore, when these parts are of such double helical or herringbone type they may be brought into correct mesh by the lateral movement of the back or intermediate shaft and the gear or pinion 21, afforded by the nature of the construction.

I have provided a pinion (high speed) to mesh with the gear 26, and a motor for driving such pinion. In the present "motorized" unit I provide a driving motor 33 having its armature shaft 34 directly provided with the high speed pinion 35 to mesh with the gear 26; and I also so arrange the parts that this driving motor may be carried directly by the end wall portion 28 of the frame section 11 to bring said high speed pinion 35 into proper meshing engagement with the gear 26, and properly support the motor in such condition. For this purpose the motor element has its end wall 36 properly counterbored or formed to set accurately into the opening 32 already referred to; and preferably said end wall of the motor element is provided with a flange 37 which sets against and may be bolted or otherwise secured to the end wall of the frame element 11 as shown. It is to be noted at this point that said end wall 28 will thereby afford support for the lower half of the motor end wall 36, since such end wall 28 of the frame element 11 extends upwardly only approximately to the center line of the shaft 10; but such amount of support is sufficient to carry the load of the driving motor and ensure proper transmission of the driving forces, since the motor is of high speed operation. Nevertheless it will also be noted that when the removable cover 29 of the housing is set into place the motor end wall 36 may also be connected thereto, by bolts or otherwise, so that thereafter the motor will be completely supported around the entire periphery of such end wall 36. When the cover 29 is again removed, for inspection or other purposes the motor element will still be held securely and rigidly in proper operative relationship with respect to the other parts of the gear reducer, and, in fact, may still be drivingly operated in such condition.

Now the end wall 36 may be either the true end wall of the motor, or it may be a separate connecting element supplemental to the motor proper. It is shown as carrying the bearing 38 for the high speed shaft. Such bearing is thus a portion of the motor element, and the pinion 35 is thus in effect an overhung pinion. The other end of the high speed or motor shaft is carried by a bearing shown at 39, so that said shaft is well supported by bearings well separated from each other. Preferably, also, these bearings are of a type to allow the motor shaft and armature to float endwise slightly, so that when the gear 26 and pinion 35 are of the double helical or herringbone type the shaft 34 may float to exact position for perfect meshing of such gear and pinion.

Now it will be noted that when the motor element, with the high speed shaft 34 and pinion 35 are secured in position to the end wall of the frame element 11, and with the cover section 29 of the reducer removed, the frame element 18, together with the back or intermediate shaft 20 and the gear 26 and pinion 21 may be set into place with respect to the other parts of the reducer, to bring said gear and pinion into proper mesh with the pinion 35 and gear 17, respectively, and with a lateral movement, so that these parts may be properly meshed, even when they are of the double helical or herringbone type, and even when using the "motorized" arrangement herein disclosed. During this operation the motor element is rigidly held in place on the frame section 11, and with the pinion 35 also in correct position.

In the modified arrangement shown in Figure 2, the bearing 38 has been eliminated, and in place thereof the end of the motor or high speed shaft is supported by the bearing 40 beyond the location of the pinion 35, said bearing 40 being carried by the bracket 15 of the frame element 11, and in alignment with the low speed shaft 10. In this case the end wall 36 of the motor element may be eliminated, and the housing of the motor field may be connected directly to the end wall 28 of the reducer frame. In such case also the pinion 35 is supported between the high speed shaft bearings, instead of being of the overhung type.

I claim:

1. In a device of the class described, the combination of a base section having a pair of upwardly extending stands, "low" speed shaft journals in said stands, a "low" speed shaft journalled in said journals, semi-housing walls in conjunction with said base section to provide an oil pan substantially to the elevation of the journals aforesaid, a removable frame section above said stands, means to secure said removable frame section rigidly with respect to said stands, a back shaft journalled in said removable frame section, a gear on the "low" speed shaft, a gear and a pinion on the back shaft, said pinion meshing with the gear of the "low" speed shaft, there being a semi-circular upwardly concave opening in the end semi-wall of the base section concentric with the axis of the "low" speed shaft, a driving motor unit having suitable shaft bearings, a pinion on the motor shaft meshing with the gear of the back shaft aforesaid, means to secure the motor rigidly to the base section at the position of said semi-circular opening of the base section end wall to thereby secure the motor and motor pinion in driving position with respect to the back shaft, together with a suitable cover element removably connected to the base section and having a semi-circular downwardly concave opening at one end serving in conjunction with the end wall of the base section to receive and support the motor at that location, whereby when said cover element is removed the motor element and gear train elements are retained in operative relationship with respect to each other, substantially as described.

2. In a device of the class described, the combination of a base section having a pair of upwardly extending stands, "low" speed shaft journals in said stands, a "low" speed shaft journalled in said journals, semi-housing walls in conjunction with said base section substantially to the elevation of the journals aforesaid, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low"

speed shaft, there being a suitable opening in the end wall of the base section adjacent to the gear of the back shaft, a driving motor unit having suitable shaft bearings, a pinion on the motor shaft meshing with the gear of the back shaft, means to secure the motor unit rigidly to the base section at the position of the opening aforesaid, to thereby secure the motor pinion in driving position with respect to the gear of the back shaft, together with a removable cover element in conjunction with said base section and serving to complete the enclosure of said "low" speed shaft and its gear, said removable frame section and the back shaft and their gear and pinion, and said motor pinion, and whereby when said cover element is removed from the base section all said other parts remain in operative and driving relationship with respect to each other, substantially as described.

3. In a device of the class described, the combination of a base section having a pair of upwardly extending stands, "low" speed shaft journals in said stands, a "low" speed shaft journalled in said journals, semi-housing walls in conjunction with said base section substantially to the elevation of the journals aforesaid, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low" speed shaft, there being a suitable opening in the end wall of the base section adjacent to the gear of the back shaft, a driving motor unit having suitable shaft bearings, a pinion on the motor shaft meshing with the gear of the back shaft, and means to secure the motor unit rigidly to the base section at the position of the opening aforesaid, to thereby secure the motor pinion in driving position with respect to the gear of the back shaft, whereby said removable frame section together with the back shaft and gear and pinion thereon may be set into place with respect to the stands to bring the said gear and pinion respectively into mesh with the motor pinion and the "low" speed shaft gear by lateral movements, substantially as described.

4. In a device of the class described, the combination of a base section having a pair of upwardly extending stands, "low" speed shaft journals in said stands, a "low" speed shaft journalled in said journals, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low" speed shaft, there being a suitable motor support on the base section adjacent to the back shaft gear, a driving motor unit having suitable shaft bearings, a pinion on the motor shaft meshing with the gear of the back shaft, and means to secure the motor unit rigidly to the motor support aforesaid, substantially as described.

5. In a device of the class described, the combination of a base section having a pair of upwardly extending stands, "low" speed shaft journals in said stands, a "low" speed shaft journalled in said journals, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low" speed shaft, there being a suitable motor support on the base section adjacent to the back shaft gear, a driving motor unit having suitable shaft bearings, a pinion on the motor shaft meshing with the gear of the back shaft, and means to secure the motor unit rigidly to the motor support aforesaid, all said pinions and gears being of the double helical or herringbone type, and said removable frame section together with said back shaft and its gear and pinion being movable laterally with respect to the motor shaft and the "low" speed shaft for assembly and dismounting purposes, substantially as described.

6. In a device of the class described, the combination of a base section having a pair of upwardly extending stands, "low" speed shaft journals in said stands, a "low" speed shaft journalled in said journals, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low" speed shaft, there being a suitable motor support on the base section at the back shaft gear end of the device, together with a driving motor unit having a suitable shaft bearing, and also having a pinion on the motor shaft, and a driving connection between said motor shaft pinion and the back shaft gear, substantially as described.

7. In a device of the class described, the combination of a base section having a pair of upwardly extending stands, "low" speed shaft journals in said stands, a "low" speed shaft journalled in said journals, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low" speed shaft, there being a suitable motor support on the base section at the back shaft gear end of the device, together with a driving motor unit having a motor shaft and a pinion on said shaft, suitable bearings for the motor shaft, at least one of said bearings being a portion of the motor unit, and a driving connection between the motor shaft pinion and the back shaft gear, substantially as described.

8. In a device of the class described, the combination of a base section having a pair of upwardly extending stands, "low" speed shaft journals in said stands, a "low" speed shaft journalled in said journals, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low" speed shaft, there being a suitable motor support on the base section at the back shaft gear end of the device, together with a driving motor unit having a motor shaft and a pinion on said shaft, a motor shaft bearing at the shaft end most removed from the back shaft gear, and another motor shaft bearing adjacent to the pinion on the motor shaft, substantially as described.

9. In a device of the class described, the combination of a base section having a pair of upwardly extending stands, "low" speed shaft journals in said stands, a "low" speed shaft journalled in said journals, a removable frame section above said stands, means to secure said removable frame section rigidly with respect to said stands, a back shaft journalled in said removable frame section, a gear on the "low" speed shaft, a gear and pinion on the back shaft, said pinion meshing with the gear of the "low" speed shaft, there being a suitable motor support on the base section at the back shaft gear end of the device, together with a driving motor unit having a motor shaft and a pinion on said shaft, a motor shaft bearing carried by the motor at the end thereof most removed from the back shaft gear, and another motor shaft bearing adjacent to the motor shaft pinion and carried by the base section aforesaid, substantially as described.

WARREN G. JONES, Jr.